United States Patent [19]

Tanaka et al.

[11] Patent Number: 4,477,810

[45] Date of Patent: Oct. 16, 1984

[54] CAPACITY TYPE ROTATION DETECTING APPARATUS

[75] Inventors: Hiroaki Tanaka; Shigeyuki Akita, both of Okazaki, Japan

[73] Assignee: Nippon Soken, Inc., Nishio, Japan

[21] Appl. No.: 413,898

[22] Filed: Sep. 1, 1982

[30] Foreign Application Priority Data

Sep. 7, 1981 [JP] Japan .................................. 56-139732

[51] Int. Cl.³ .............................................. G08C 19/10
[52] U.S. Cl. .............................. 340/870.37; 324/61 R; 340/347 P
[58] Field of Search ........................ 340/870.37, 347 P; 318/662; 324/61 R, 61 P

[56] References Cited

U.S. PATENT DOCUMENTS

| | | | |
|---|---|---|---|
| 3,760,392 | 9/1973 | Stich | 340/870.37 |
| 3,873,916 | 3/1975 | Sterki | 340/870.37 |
| 3,938,113 | 2/1976 | Dobson | 340/870.37 |
| 3,961,318 | 6/1976 | Farrand | 340/870.37 |
| 4,092,579 | 5/1978 | Weit | 340/870.37 |
| 4,199,800 | 4/1980 | Weit | 340/870.37 |

*Primary Examiner*—James J. Groody
*Attorney, Agent, or Firm*—Cushman, Darby & Cushman

[57] ABSTRACT

A capacity type rotation detecting apparatus includes a fixed first plate and a rotational second plate which are arranged to face each other and are respectively made of an electrically insulating material. Provided on the first plate are a plurality of electrodes arranged circumferentially and forming a pair of sets of input rotational angle detection electrodes and a pair of sets of input reference angular position detection electrodes and at least two capacitive coupling signal transmitting electrically conductive rings. Also provided on the second plate are at least one set of output rotational angle detection electrodes and at least one set of output reference angular position detection electrodes arranged to face the respective pairs of sets of electrodes on the first plate and at least two capacitive coupling signal transmitting electrically conductive rings which are respectively connected to the at least two sets of electrodes on the second plate and respectively arranged to face the at least two rings on the first plate. The capacity type rotation detecting apparatus further includes first and second periodic signal supply circuits which have different repetition periods and respectively supply detecting signals of opposite phase to the respective pairs of sets of input electrodes on the first plate, and a rotational angle signal generating circuit and a reference angular position signal generating circuit responsive to respective signals generated at the at least two rings on the first plate to generate a rotational angle detection signal and a reference angular position detection signal, respectively, thereby simultaneously providing detection signals accurately without any delay irrespective of the rotational speeds of the second plate.

7 Claims, 10 Drawing Figures

CAPACITY TYPE ROTATION DETECTING APPARATUS

BACKGROUND OF THE INVENTION

1. Field of the Invention

The present invention relates to an apparatus for detecting, for example, angular rotational positions of the crankshaft of an engine in an automobile, and more particularly to a rotation detecting apparatus capable of detecting a reference angular position and rotational angles of a rotating object such as the crankshaft of an engine without any delay irrespective of its rotational speeds.

2. Description of the Prior Art

The apparatus heretofore known for detecting the rotation of the crankshaft of an automobile engine includes an apparatus in which a magnetic member having a coil wound thereon is positioned opposite to a rotational member and an alternating electromotive force is induced in the coil in response to the magnetic flux variations in the projections on the magnetic member.

However, this type of apparatus is disadvantageous in that the alternating electromotive force induced in the coil is affected by the magnetic flux variations, that is, by the rotational speeds of the rotational member. If the speed of the rotational member is low, practically no alternating electromotive force is induced in the coil, which makes it impossible to detect the rotation of the rotational member. If the speed of the rotational member increases, the inductance of the coil gives rise to a delay in the detection of the rotation of the rotational member.

Another disadvantage is that, where the detection of rotational angle signals and a reference angular position signal is required, it is necessary to provide separate corresponding projections on the rotational member and detecting means at two places, which makes the construction of the rotation detecting apparatus complicated. The present invention is intended to overcome the foregoing deficiencies of the prior art.

SUMMARY OF THE INVENTION

It is an object of this invention to provide a capacity type rotation detecting apparatus comprising a first plate and a second plate arranged opposite to the first plate; the first plate having first and second input electrode pieces arranged along a circumference at respective equally given intervals and contiguously intermeshed, the first and second input electrode pieces providing a first input reference angular position detection electrode comprising a set of the first input electrode pieces arranged at respective different intervals therebetween, a second input reference angular position detection electrode comprising a set of the second input electrode pieces each of which is adjacent to one of the first input reference angular position detection electrode pieces on one side thereof, a first input rotational angle detection electrode comprising a set of the first input electrode pieces other than the first input reference angular position detection electrode pieces, and a second input rotational angle detection electrode comprising a set of the second input electrode pieces other than the second input reference angular position detection electrode pieces; the second plate having at least one output reference angular position detection electrode arranged to face the first and second input reference angular position detection electrodes of the first plate and at least one output rotational angle detection electrode arranged to face the first and second input rotational angle detection electrodes of the first plate; wherein the electrodes of the first plate and the electrodes of the second plate face one another upon the rotation of one of the first and second plates which is coupled to a rotational object under measurement, periodic signals of opposite phase are applied to the first and second input reference angular position detection electrodes of the first plate from a first periodic signal supply circuit, periodic signals having a different repetition period and of opposite phase are applied to the first and second input rotational angle detection electrodes of the first plate from a second periodic signal supply circuit, and these applied signals are respectively detected by the output reference angular position detection electrode and the output rotational angle detection electrode of the second plate and thus the phases of the signals appearing at the respective electrodes of the second plate are detected, thereby making it possible to detect a reference angular position and rotational angles of the rotational object simultaneously, by the use of a single apparatus, with high precision and without any delay, irrespective of the speeds of the rotational object.

DESCRIPTION OF THE PREFERRED EMBODIMENTS

The present invention will now be described in greater detail with reference to the illustrated embodiments. The first embodiment shown in FIGS. 1 to 5 will be described firstly.

Figure 1:
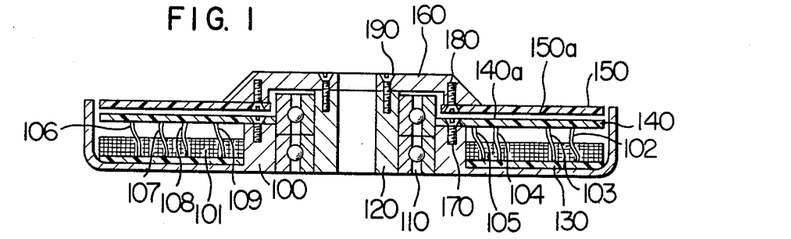
FIG. 1 is a longitudinal sectional view showing an example of a rotation detecting apparatus containing the rotational and stationary plates having the electrode structure according to this invention.

Referring to FIG. 1, numeral 100 designates a housing fixed to the outer side of a bearing 110, and 120 a shaft fixed to the inner side of the bearing 110 and coupled, for example, to the crankshaft of an engine so that the rotation of the shaft 120 causes the rotation of a rotational member 160 which is fastened by screws 190 to the shaft 120. Also fastened by way of screws 180 to the rotational member 160 is a second plate 150 comprising a printed board having electrodes formed thereon by printing and adapted to be rotated by the rotation of the rotational member 160. Also, a first plate 140 comprising a printed board having electrodes formed thereon by printing is fastened by screws 170 to the housing 100, and connected to the first plate 140 are signal lines 102, 103, 104, 105, 106, 107, 108 and 109 from a detecting circuit section 101 which is provided on a printed board 130.

Figure 2A:
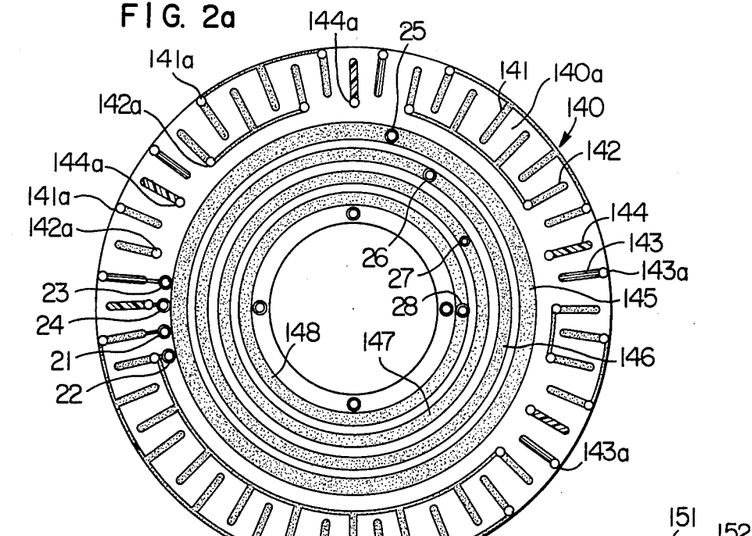
FIGS. 2a and 2b are front views showing respectively the electrode structure on the confronting surfaces of the first and second plates in the apparatus shown in FIG. 1.

FIG. 2a shows a surface 140a of the first plate 140 which faces a surface 150a of the second plate 150. The signal lines 102, 103, 104, 105, 106, 107, 108 and 109 are respectively connected at connecting points 21, 22, 23, 24, 25, 26, 27 and 28 to first and second input rotational angle detection electrodes 141 and 142, first and second reference angular position detection electrodes 143 and 144 and first, second, third and fourth ring-shaped electrodes 145, 146, 147 and 148 of the first plate 140. The first input reference angular position detection electrode 143 comprises a plurality of electrode pieces arranged at respective different intervals therebetween and connected to one another on the back surface of the first plate 140 via connecting points 143a. The second input reference angular position detection electrode 144 comprises a plurality of electrode pieces arranged respectively on the same side with and equally spaced from the electrode pieces of the first input reference angular position detection electrode 143 and connected to one another on the first plate back surface via connecting points 144a. Also, each of the first and second input rotational angle detection electrodes 141 and 142 comprises a plurality of electrode pieces and the pieces of the two electrodes are contiguously intermeshed and arranged at respective equally given intervals at positions where the first and second input reference angular position detection electrodes 143 and 144 are not present.

Figure 2B:
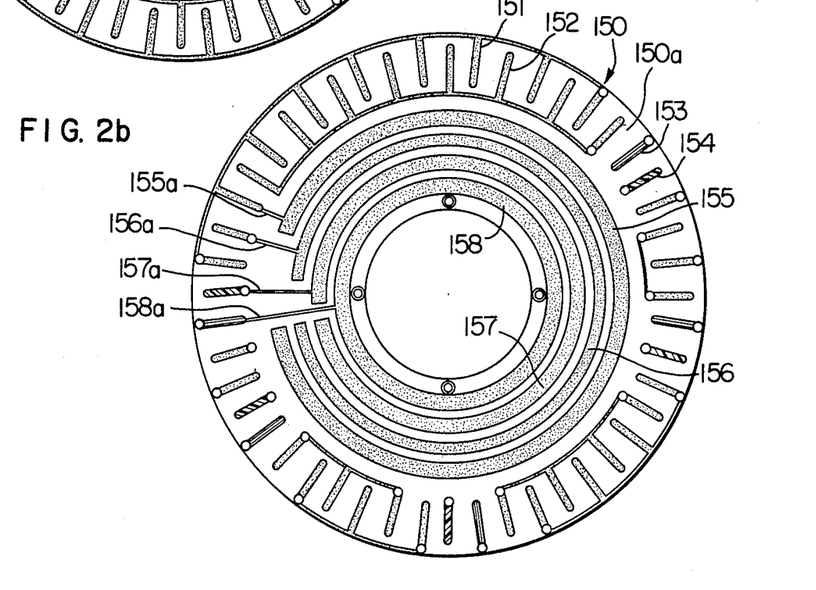

FIG. 2b shows the surface 150a of the second plate 150 which faces the surface 140a of the first plate 140. Its first and second output reference angular position detection electrodes 153 and 154 are respectively positioned to face the first and second input reference angular position detection electrodes 143 and 144 of the first plate 140. The first and second input reference angular position detection electrodes 143 and 144 of the first plate 140 and the first and second output reference angular position detection electrodes 153 and 154 of the second plate 150 are arranged so that, when the second plate 150 rotates one time, all the electrode pieces of the second plate 150 face all the electrode pieces of the first plate 140 simultaneously only once. Also, the first and second output rotational angle detection electrodes 151 and 152 of the second plate 150 are respectively arranged to face the first and second input rotational angle detection electrodes 141 and 142 of the first plate 140.

The first and second output rotational angle detection electrodes 151 and 152 and the first and second output reference angular position detection electrodes 153 and 154 are respectively connected to first, second, third and fourth ring-shaped electrodes 155, 156, 157 and 158 via respective connecting lines 155a, 156a, 158a and 157a.

Figure 3:
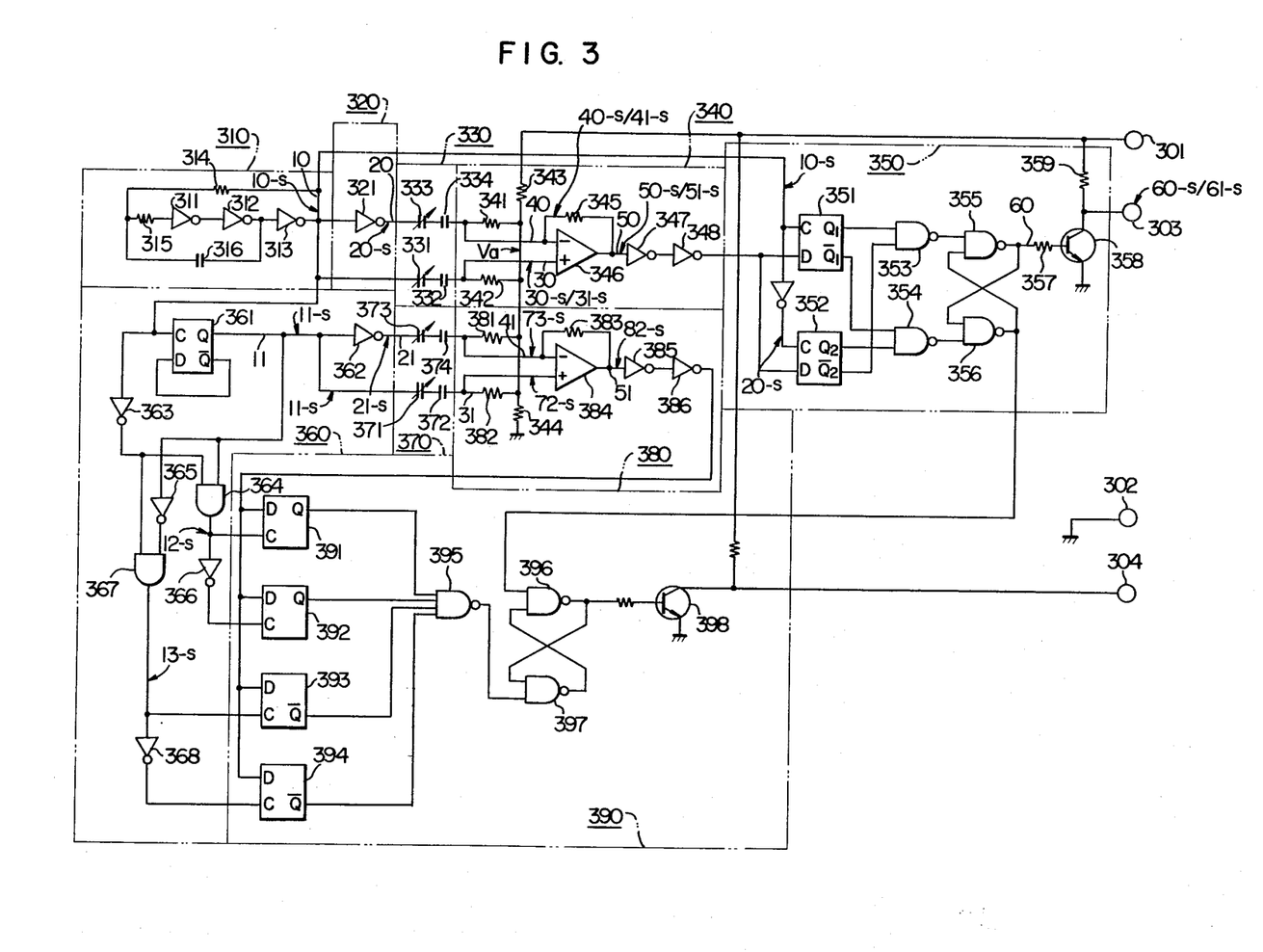
FIG. 3 is a wiring diagram for the detecting circuit section in the apparatus according to the first embodiment of this invention shown in FIG. 1.

FIG. 3 shows a wiring diagram of the detecting circuit section 101. In the Figure, a terminal 301 is a power supply terminal to which a constant voltage Vc is supplied. A terminal 302 is a ground terminal. Numeral 310 designates a known type CR oscillator circuit, and 320 a first reference signal generating circuit. Numeral 330 designates a rotational angle signal detector comprising the first and second output rotational angle detection electrodes 151 and 152 and the first and second ring-shaped electrodes 155 and 156 of the second plate 150 and the first and second input rotational angle detection electrodes 141 and 142 and the first and second ring-shaped electrodes 145 and 146 of the first plate 140. Numeral 340 designates a first comparison circuit, 350 a first phase detecting circuit, and 303 a first output terminal.

Numeral 360 designates a second reference signal generating circuit. Numeral 370 designates a reference angular position signal detector comprising the first and second output reference angular position detection electrodes 153 and 154 and the third and fourth ring-shaped electrodes 157 and 158 of the second plate 150 and the first and second input reference angular position detection electrodes 143 and 144 and the third and fourth ring-shaped electrodes 147 and 148 of the first plate 140. Numeral 380 designates a second comparison circuit, 390 a second phase detecting circuit, and 304 a second output terminal.

The CR oscillator circuit 310 and the first reference signal generating circuit 320 form a first periodic signal supply circuit, and the CR oscillator circuit 310 and the second reference signal generating circuit 360 form a second periodic signal supply circuit. Also, the first comparison circuit 340 and the first phase detecting circuit 350 form a rotational angle signal generating circuit, and the second comparison circuit 380 and the second phase detecting circuit 390 form a reference angular position signal generating circuit.

Figure 5:
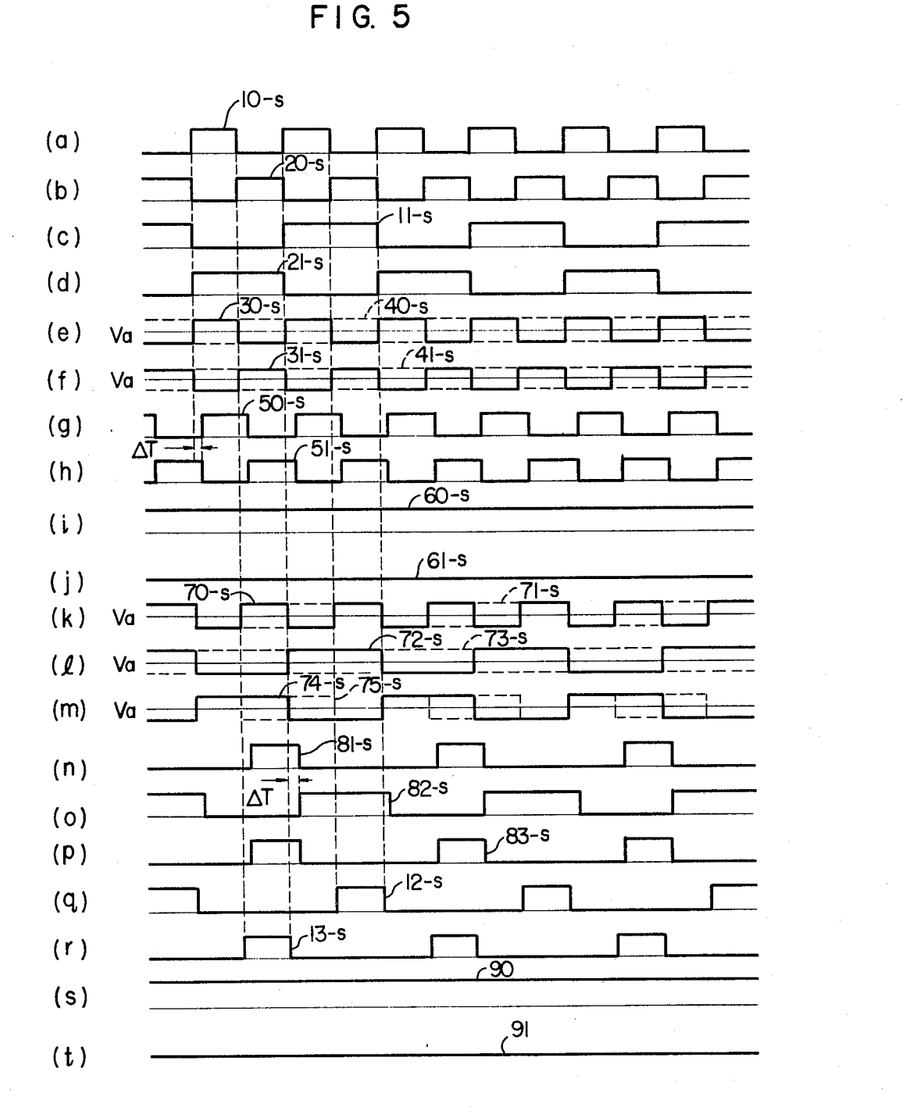
FIG. 5 shows a plurality of signal waveforms which are useful for explaining the operation of the apparatus of the first embodiment of this invention.

Next, the operation of the electronic circuit of the above-described construction will be described. An oscillation waveform 10-s shown at (a) of FIG. 5 is produced by the CR oscillator circuit 310 comprising inverter gates 311, 312 and 313, resistors 314 and 315 and a capacitor 316 as shown in FIG. 3. This oscillation waveform 10-s is transmitted to the first reference signal generating circuit 320, where a signal of the same phase as the oscillation waveform 10-s and simultaneously a signal 20-s of the opposite phase shown at (b) of FIG. 5 are generated.

Figure 4A:
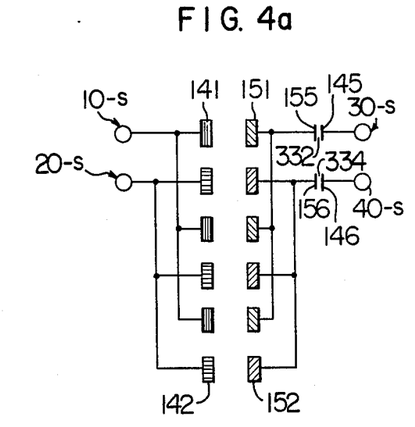
FIGS. 4a and 4b are circuit diagrams showing respectively the relative positions of the first and second input rotational angle detection electrodes and the first and second output rotational angle detection electrodes shown in FIGS. 2a and 2b, occurring during the rotation of one of the first and second plates which is coupled to a rotational object under measurement, which circuit diagrams are useful for explaining the operation of the apparatus shown in FIG. 1.

The method of the rotational angle signal detection will be described firstly. Description will be made with reference to a case where the rotation of the shaft 120 (shown in FIG. 1) rotates the second plate 150 so that the first output rotational angle detection electrode 151 of the second plate 150 is positioned opposite to the first input rotational angle detection electrode 141 of the first plate 140 and simultaneously the second output rotational angle detection electrode 152 of the second plate 150 is positioned opposite to the second input rotational angle detection electrode 142 of the first plate 140 as shown in FIG. 4a.

In this case, when a signal of the same phase with the oscillation waveform 10-s is applied to the first input rotational angle detection electrode 141 of the first plate 140 via the signal line 102, a signal of the same phase with the oscillation waveform 10-s appears on the connecting line 155a shown in FIG. 2b through a capacitor (designated as 331 in FIG. 3) comprising the first input rotational angle detection electrode 141 of the first plate 140 and the first output rotational angle detection electrode 151 of the second plate 150, and this signal is transmitted as a signal 30-s shown at (e) of FIG. 5 to the first comparison circuit 340 through a capacitor (designated as 332 in FIG. 3) comprising the first ring-shaped electrode 155 of the second plate 150 and the first ring-shaped electrode 145 of the first plate 140. In the like manner, the signal 20-s transmitted to the second input rotational angle detection electrode 142 of the first plate 140 via the signal line 103 appears as a signal of the same phase with the signal 20-s at the second output rotational angle detection electrode 152 of the second plate 150 through a capacitor (designated as 333 in FIG. 3) comprising the second input rotational angle detection electrode 142 of the first plate 140 and the second output rotational angle detection electrode 152 of the second plate 150. Then, the signal is transmitted as a signal 40-s shown by the broken line at (e) of FIG. 5 to the first comparison circuit 340 through a capacitor (designated as 334 in FIG. 3) comprising the second ring-shaped electrode 156 of the second plate 150 and the second ring-shaped electrode 146 of the first plate 140 and via the connecting point 26. It should be noted that while there are cases where five electrode pieces at the maximum of the first and second output rotational angle detection electrodes 151 and 152 of the second plate 150 respectively face the electrode pieces of the first and second input reference angular position detection electrodes 143 and 144 of the first plate 140, the number of such facing electrode pieces is small as compared with the number of the other electrode pieces of the first and second output rotational angle detection electrodes 151 and 152 of the second plate 150, and therefore the effect of such minor electrode pieces can be neglected.

With a dc voltage Va determined by resistors 343 and 344 in the comparison circuit 340 being added as a bias voltage thereto, each of the signals 30-s and 40-s has a waveform shown at (e) of FIG. 5. Then, the signals 30-s and 40-s are differentially amplified by a differential amplifier circuit comprising an operational amplifier 346 (hereinafter simply referred to as an OP AMP) and a resistor 345 in the first comparison circuit 340, and the waveform shown at (g) of FIG. 5 which is delayed by a time $\Delta T$ from the oscillation waveform 10-s is generated as a signal 50-s at the output of the differential amplifier circuit. Note that the time $\Delta T$ represents the sum of the response delay time of the capacitors and the switching delay time of the OP AMP 346. Then, the waveform of the signal 50-s is reshaped through inverter gates 347 and 348, and a waveform of the same phase with the signal 50-s is applied to the D-terminal of D-type flip-flops 351 and 352, respectively. Also, a signal of the same phase with the oscillation waveform 10-s is applied from the oscillator circuit 310 to the clock terminal of the D-type flip-flop 351 and a signal of the opposite phase to the oscillation waveform 10-s is applied to the clock terminal of the D-type flip-flop 352. Thus, the level of the output terminal $Q_1$ of the D-type flip-flop 351 becomes "1" and the level of the output terminal $Q_2$ of the D-type flip-flop 352 becomes "0". Then, a "0" level signal appears on a signal line 60 through the circuit comprising NAND gates 353, 354, 355 and 356. This signal is supplied to an output circuit comprising a transistor 358 and resistors 357 and 359, so that the transistor 358 is turned off by the signal applied to its base, and a rotational angle signal "1" (a signal 60-s shown at (i) of FIG. 5) is generated at the first output terminal 303, thus indicating that the first output rotational angle detection electrode 151 of the second plate 150 is opposite to the first input rotational angle detection electrode 141 of the first plate 140 (in other words, the second output rotational angle detection electrode 152 of the second plate 150 is opposite to the second input rotational angle detection electrode 142 of the first plate 140).

Figure 4B:
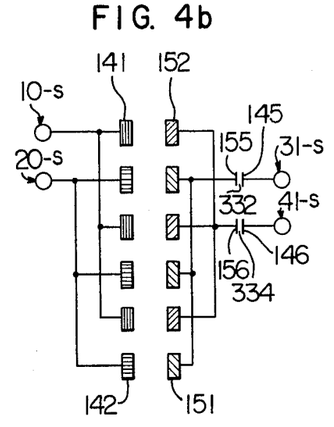

On the other hand, when the first output rotational angle detection electrode 151 of the second plate 150 is opposite to the second input rotational angle detection electrode 142 of the first plate 140 and the second output rotational angle detection electrode 152 of the second plate 150 is opposite to the first input rotational angle detection electrode 141 of the first plate 140 as shown in FIG. 4b, a signal of the same phase with the signal 20-s appears at the first output rotational angle detection electrode 151 of the second plate 150, and a signal 31-s shown at (f) of FIG. 5 having the dc voltage Va added as the bias voltage thereto as mentioned previously is generated at the first ring-shaped electrode 145 of the first plate 140. Simultaneously, a signal of the same phase with the oscillation waveform 10-s appears at the second output rotational angle detection electrode 152 of the second plate 150, and a signal 41-s shown at (f) of FIG. 5 having the dc voltage Va added as the bias voltage thereto is generated at the second ring-shaped electrode 146 of the first plate 140. Then, a signal 51-s shown at (h) of FIG. 5 is generated at the output terminal of the first comparison circuit 340. Then, a "1" level signal is generated on the signal line 60 of the first phase detecting circuit 350, so that a rotational angle signal "0" (a signal 61-s shown at (j) of FIG. 5) is generated at the first output terminal 303, thus indicating that the first output rotational angle detection electrode 151 of the second plate 150 is opposite to the second input rotational angle detection electrode 142 of the first plate 140.

In this way, when the shaft 120 rotates, the first and second output rotational angle detection electrodes 151 and 152 arranged on the second plate 150 pass over the first and second input rotational angle detection electrodes 141 and 142 arranged on the first plate 140, so that "1" and "0" signals are generated alternately at the first output terminal 303 once at every rotation, thereby making it possible to detect the rotation of the second plate 150, namely, the rotation of the shaft 120.

Next, the method of the reference angular position signal detection will be described. As mentioned previously, all the electrode pieces of the first and second output reference angular position detection electrodes 153 and 154 of the second plate 150 face all the electrode pieces of the first and second input reference angular position detection electrodes 143 and 144 of the first plate 140 once at every rotation of the second plate 150.

Figure 6A:
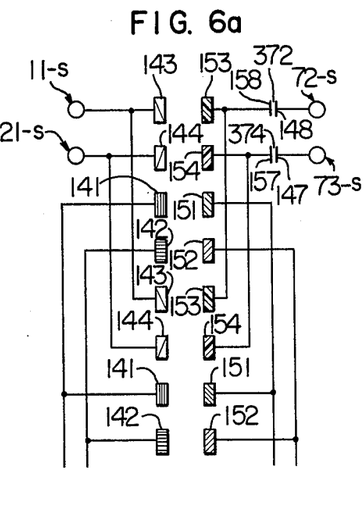
FIGS. 6a and 6b are circuit diagrams showing respectively the relative positions of the first and second input reference angular position detection electrodes and the first and second output reference angular position detection electrodes shown in FIGS. 2a and 2b, occurring during the rotation of the rotational plate, which circuit diagrams are useful for explaining the operation of the apparatus shown in FIG. 1.

Description will be made with reference to a case where the whole first output reference angular position detection electrode 153 of the second plate 150 is opposite to the whole first input reference angular position detection electrode 143 of the first plate 140 and the whole second output reference angular position detection electrode 154 of the second plate 150 is opposite to the whole second input reference angular position detection electrode 144 of the first plate 140 as shown in FIG. 6a. The previously mentioned oscillation signal 10-s from the CR oscillator circuit 310 is applied to the clock terminal of a D-type flip-flop 361 of the second reference signal generating circuit 360, and a signal 11-s produced by dividing the frequency of the oscillation signal 10-s by 2 and a signal 21-s of the opposite phase to the signal 11-s are respectively generated on the signal lines 11 and 21 shown in FIG. 3. The signals 11-s and 21-s are respectively applied to the first and second input reference angular position detection electrodes 143 and 144 of the first plate 140. Then, a signal of the same phase with the signal 11-s appears on the connecting line 158a shown in FIG. 2b through a capacitor (a capacitor designated as 371 in FIG. 3) comprising the first input reference angular position detection electrode 143 of the first plate 140 and the first output reference angular position detection electrode 153 of the second plate 150, and a signal 72-s shown at (l) of FIG. 5 is generated on a signal line 31 (shown in FIG. 3) through a capacitor (a capacitor designated as 372 in FIG. 3) comprising the fourth ring-shaped electrode 158 of the second plate 150 and the fourth ring-shaped electrode 148 of the first plate 140. In the like manner, a signal of the same phase with the signal 21-s appears on the connecting line 157a shown in FIG. 2b through a capacitor (a capacitor designated as 373 in FIG. 3) comprising the second input reference angular position detection electrode 144 of the first plate 140 and the second output reference angular position detection electrode 154 of the second plate 150, and a signal 73-s shown at (l) of FIG. 5 and having the same phase with the signal 21-s is generated on the signal line 41 shown in FIG. 3 through a capacitor (a capacitor designated as 374 in FIG. 3) comprising the third ring-shaped electrode 157 of the second plate 150 and the third ring-shaped electrode 147 of the first plate 140. These signals 72-s and 73-s are biased by the dc voltage Va and are differentially amplified by an OP AMP 384 of the second comparison circuit 380, and a signal 82-s shown at (0) of FIG. 5 and delayed from the signal 11-s by the time ΔT is generated on the line 51 shown in FIG. 3. The waveform of the signal 82-s is reshaped by inverter gates 385 and 386 and thus a signal of the same phase with the signal 82-s is applied to the D-terminal of each of D-type flip-flops 391, 392, 393 and 394 of the second phase detecting circuit 390. On the other hand, by means of AND gates 364 and 367 and inverter gates 363, 365, 366 and 368 of the second reference signal generating circuit 360, a signal 12-s shown at (q) of FIG. 5 is generated at the output of the AND gate 364 and a signal 13-s shown at (r) of FIG. 5 is generated at the output of the AND gate 367. The signal 12-s is applied to the clock terminal of the D-type flip-flop 391, and a signal of the opposite phase to the signal 12-s is applied to the clock terminal of the D-type flip-flop 392. The signal 13-s is applied to the clock terminal of the D-type flip-flop 393, and a signal of the opposite phase to the signal 13-s is applied to the clock terminal of the D-type flip-flop 394.

As mentioned previously, when the signal 82-s is applied to the D-terminal of the D-type flip-flop 391, 392, 393 and 394, respectively, the level of the output terminal of a NAND gate 395 becomes "0" and the level of the output terminal of a NAND gate 396 becomes "0", so that a transistor 398 is turned off thereby to cause the level of the second output terminal 304 to become "1" (as indicated by a signal 90 shown at (s) of FIG. 5).

Figure 6B:
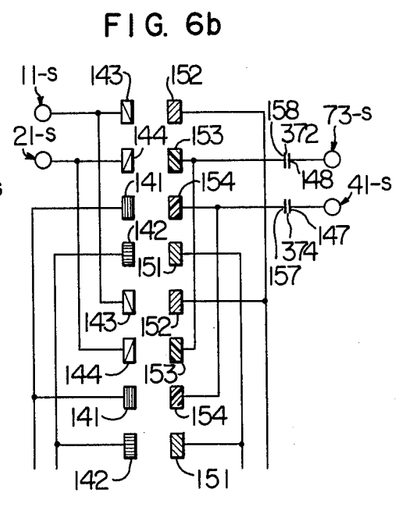

Then, when the second plate 150 rotates so that the first output reference angular position detection electrode 153 of the second plate 150 is opposite to the second input reference angular position detection electrode 144 of the first plate 140 and the second output reference angular position detection electrode 154 of the second plate 150 is opposite to the first input rotational angle detection electrode 141 of the first plate 140, as shown in FIG. 6b, the first output rotational angle detection electrode 151 of the second plate 150 is opposite to the second input rotational angle detection electrode 142 of the first plate 140 and the second output rotational angle detection electrode 152 of the second plate 150 is opposite to the first reference angular position detection electrode 143 of the first plate 140. Thus, in FIG. 3, the level of the output terminal of the NAND gate 356 becomes "0" and the level of the output terminal of the NAND gate 396 becomes "1", which in turn renders the transistor 398 nonconductive, thereby causing the level of the second output terminal 304 to become "0" (as indicated by a signal 91 shown at (t) of FIG. 5). In this way, when the shaft 120 rotates, all the electrode pieces of the first and second output reference angular position detection electrodes 153 and 154 of the second plate 150 respectively face all the electrode pieces of the first and second input reference angular position detection electrodes 143 and 144 of the first plate 140 only once at every rotation of the shaft 120, thereby causing the level of the second output terminal 304 to become "1" under such a specified condition but to become "0" under any other conditions. In other words, it is possible to obtain a reference angular position signal whose level becomes "1" only once at every rotation of the shaft 120.

Figure 7:
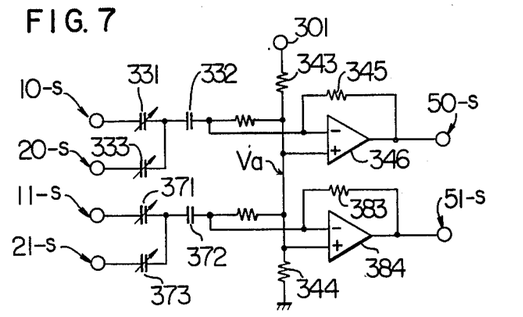
FIG. 7 is a wiring diagram showing a part of the detecting circuit section of a second embodiment of the invention.

In the above-described first embodiment, the second plate 150 is provided with the first and second output rotational angle detection electrodes 151 and 152 and the first and second output reference angular position detection electrodes 153 and 154 as the output rotational angle detection electrodes and the output reference angular position detection electrodes thereof, and the signals appearing at the respective electrodes are compared with one another by the first and second comparison circuits 340 and 380, respectively. However, if the output rotational angle detection electrode and the reference angular position detection electrode respectively comprise only the first output rotational angle detection electrode 151 and the first output reference angular position detection electrode 153, the previously mentioned ring-shaped electrodes may comprise only the first electrode 155 and the third electrode 157. Accordingly, the opposing ring-shaped electrodes of the first plate 140 may comprise only the first electrode 145 and the third electrode 147. The wiring diagram of the rotational angle signal detector 330, the reference angular position signal detector 370 and the first and second comparison circuit 340 and 380 in such a case is shown in the second embodiment of FIG. 7. In this case, the signals generated at the first and third ring-shaped electrodes 155 and 157 are respectively compared with a predetermined dc voltage Va by the first and second comparison circuits 340 and 380 to generate respective outputs. Thus, it is possible to obtain the same results as the previously-mentioned first embodiment.

From the foregoing description, it will be apparent that the capacity type rotation detecting apparatus of this invention has a great advantage such that rotational angles and a reference angular position of a rotational object under measurement can be detected simultaneously by the use of a single apparatus, without any delay, still with high precision, irrespective of the speeds of the rotational object.

We claim:

1. A capacity type rotation detecting apparatus comprising:

a first plate having a plurality of electrode pieces of a first input electrode and a plurality of electrode pieces of a second input electrode arranged along a circumference at respective equally given intervals and contiguously intermeshed, said first input electrode pieces forming a first input reference angular position detection electrode comprising a set of said first input electrode pieces selected at respective different intervals and further forming a first input rotational angle detection electrode comprising a set of said first input electrode pieces other than said first input reference angular position detection electrode pieces, and said second input electrode pieces forming a second input reference angular position detection electrode comprising a set of said second input electrode pieces each thereof being positioned adjacent to one of said first input reference angular position detection electrode pieces on one side thereof and further forming a second input rotational angle detection electrode comprising a set of said second input electrode pieces other than said second input reference angular position detection electrode pieces, a second plate having output reference angular position detection electrode means arranged to face said first and second input reference angular position detection electrodes and output rotational angle detection electrode means arranged to face said first and second input rotational angle detection electrodes;

a first periodic signal supply circuit for supplying periodic signals of opposite phase to said first and second input reference angular position detection electrodes;

a second periodic signal supply circuit for supplying periodic signals, which are of opposite phase to each other and have a repetition period different from that of said periodic signals supplied to said first and second input reference angular position detection electrodes, to said first and second input rotational angle detection electrodes;

a reference angular position signal generating circuit for generating a reference angular position signal in response to signals generated at said output reference angular position detection electrode means when said second plate is rotated relative to said first plate;

a rotational angle signal generating circuit for generating a rotational angle signal in response to signals generated at said output rotational angle detection electrode means; and signal transmitting means for transmitting signals between said second plate and said first plate which is fixed.

2. An apparatus according to claim 1, wherein said second periodic signal supply circuit includes a frequency divider circuit for dividing the frequency of the periodic signals from said first periodic signal supply circuit.

3. An apparatus according to claim 1 or 2, wherein said output reference angular position detection electrode means of said second plate comprises first and second output reference angular position detection electrodes respectively arranged to face said first and second input reference angular position detection electrodes of said first plate, wherein said output rotational angle detection electrode means of said second plate comprises first and second output rotational angle detection electrodes respectively arranged to face said first and second input rotational angle detection electrodes of said first plate, wherein said reference angular position signal generating circuit comprises a first comparison circuit for comparing the levels of signals appearing at said first and second output reference angular position detection electrodes of said second plate with each other to generate an output signal and a first phase detecting circuit for detecting the phase difference between the output signal from said first comparison circuit and the periodic signals from said first periodic signal supply circuit to generate a reference angular position signal when the phase of the output signal from said first comparison circuit is reversed, and wherein said rotational angle signal generating circuit comprises a second comparison circuit for comparing the levels of signals generated at said first and second output rotational angle detection electrodes of said second plate with each other to generate an output signal and a second phase detecting circuit for detecting the phase difference between the output signal from said second comparison circuit and the periodic signals from said second periodic signal supply circuit to generate a rotational angle signal when the phase of the output signal from said second comparison circuit is reversed.

4. An apparatus according to claim 1 or 2, wherein said output reference angular position detection electrode means of said second plate comprises an electrode arranged to face one of said first and second input reference angular position detection electrodes of said first plate, wherein said output rotational angle detection electrode means of said second plate comprises an electrode arranged to face one of said first and second input rotational angle detection electrodes of said first plate, wherein said reference angular position signal generating circuit comprises a first comparison circuit for comparing the levels of a signal generated at the electrode of said output reference angular position detection electrode means and a signal having a predetermined level with each other to generate an output signal and a first phase detecting circuit for detecting the phase difference between the output signal from said first comparison circuit and the periodic signals from said first periodic signal supply circuit to generate a reference angular position signal when the phase of the output signal from said first comparison circuit is reversed, and said rotational angle signal generating circuit comprises a second comparison circuit for comparing the levels of a signal generated at the electrode of said output rotational angle detection electrode means and a signal having a predetermined level with each other to generate an output signal and a second phase detecting circuit for detecting the phase difference between the output signal from said second comparison circuit and the periodic signals from said second periodic signal supply circuit to generate a rotational angle signal when the phase of the output signal from said second comparison circuit is reversed.

5. An apparatus according to claim 1 or 2, wherein said signal transmitting means comprises a plurality of ring-shaped signal transmitting electrodes arranged on each of said first and second plates to face one another whereby the transmission of signals is effected in contactless wise through a plurality of capacitors formed by said signal transmitting electrodes.

6. An apparatus according to claim 3, wherein said signal transmitting means comprises a plurality of ring-shaped signal transmitting electrodes arranged on each of said first and second plates to face one another whereby the transmission of signals is effected in contactless wise through a plurality of capacitors formed by said signal transmitting electrodes.

7. An apparatus according to claim 4, wherein said signal transmitting means comprises a plurality of ring-shaped signal transmitting electrodes arranged on each of said first and second plates to face one another whereby the transmission of signals is effected in contactless wise through a plurality of capacitors formed by said signal transmitting electrodes.

* * * * *